United States Patent
Scian et al.

(10) Patent No.: US 8,732,245 B2
(45) Date of Patent: May 20, 2014

(54) METHOD, SYSTEM AND COMPUTER SOFTWARE PRODUCT FOR PRE-SELECTING A FOLDER FOR A MESSAGE

(75) Inventors: Anthony F. Scian, Waterloo (CA); David P. Yach, Waterloo (CA); R. Scotte Zinn, Kitchener (CA); Gerhard D. Klassen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1033 days.

(21) Appl. No.: 10/537,284

(22) PCT Filed: Feb. 7, 2003

(86) PCT No.: PCT/CA03/00183
§ 371 (c)(1),
(2), (4) Date: Jun. 1, 2005

(87) PCT Pub. No.: WO2004/051522
PCT Pub. Date: Jun. 17, 2004

(65) Prior Publication Data
US 2006/0026236 A1  Feb. 2, 2006

Related U.S. Application Data

(60) Provisional application No. 60/430,369, filed on Dec. 3, 2002.

(51) Int. Cl.
*G06F 15/16* (2006.01)
*H04L 12/58* (2006.01)
(52) U.S. Cl.
CPC .............. *H04L 51/04* (2013.01); *H04L 51/16* (2013.01)
USPC ............................ 709/205; 707/739; 707/812
(58) Field of Classification Search
USPC ................................................. 709/206, 207
See application file for complete search history.

(56) References Cited

U.S. PATENT DOCUMENTS

| | | | |
|---|---|---|---|
| 5,765,170 A | | 6/1998 | Morikawa |
| 6,044,205 A | * | 3/2000 | Reed et al. .................... 709/201 |

(Continued)

FOREIGN PATENT DOCUMENTS

| | | |
|---|---|---|
| JP | 8186594 | 7/1996 |
| WO | WO 02/077768 | 10/2002 |

OTHER PUBLICATIONS

"Agents that Reduce Work and Information Overload" Jul. 1, 1994, pp. 31-40, XP002193398.

(Continued)

*Primary Examiner* — Greg C Bengzon
(74) *Attorney, Agent, or Firm* — Bereskin & Parr LLP/S.E.N.C.R.L., s.r.l (57) ABSTRACT

In a computer system, a system, method and computer program product for pre-selecting a folder for a current message. The system, method and computer program product involve (a) providing a folder pre-selection cache having n configurable entries, n being a predetermined positive integer greater than one, each configurable entry being configured to include an associated pre-selection criterion for matching with the current message, and an associated folder identification for identifying an associated folder in the plurality of folders; (b) for at least one entry in the folder pre-selection cache, comparing a comparison criterion, obtained from the current message, with the associated pre-selection criterion to determine a matching entry in the folder pre-selection cache; and, (c) pre-selecting the folder identified by the associated folder identification of the matching entry when the message comparison module determines the matching entry in the folder pre-selection cache.

48 Claims, 5 Drawing Sheets

(56) References Cited

U.S. PATENT DOCUMENTS

| | | | |
|---|---|---|---|
| 6,073,142 A * | 6/2000 | Geiger et al. | 715/205 |
| 6,212,525 B1 * | 4/2001 | Guha | 707/747 |
| 6,216,122 B1 * | 4/2001 | Elson | 1/1 |
| 6,330,589 B1 * | 12/2001 | Kennedy | 709/206 |
| 6,411,947 B1 * | 6/2002 | Rice et al. | 706/47 |
| 6,424,995 B1 * | 7/2002 | Shuman | 709/206 |
| 6,453,341 B1 | 9/2002 | Miloslavsky | |
| 6,532,465 B2 * | 3/2003 | Hartley et al. | 707/610 |
| 6,549,957 B1 * | 4/2003 | Hanson et al. | 710/5 |
| 6,594,665 B1 * | 7/2003 | Sowa et al. | 1/1 |
| 6,598,034 B1 * | 7/2003 | Kloth | 706/47 |
| 6,618,733 B1 * | 9/2003 | White et al. | 707/739 |
| 6,654,787 B1 * | 11/2003 | Aronson et al. | 709/206 |
| 6,745,197 B2 | 6/2004 | McDonald | |
| 6,768,989 B2 * | 7/2004 | Jameson | 707/737 |
| 6,803,929 B2 * | 10/2004 | Hinegardner et al. | 715/769 |
| 6,842,876 B2 * | 1/2005 | Schilit et al. | 715/256 |
| 6,847,989 B1 * | 1/2005 | Chastain et al. | 709/207 |
| 6,990,628 B1 * | 1/2006 | Palmer et al. | 715/234 |
| 7,024,491 B1 * | 4/2006 | Hanmann et al. | 709/248 |
| 7,035,903 B1 * | 4/2006 | Baldonado | 709/206 |
| 7,051,277 B2 * | 5/2006 | Kephart et al. | 715/273 |
| 7,080,123 B2 * | 7/2006 | Freed | 709/206 |
| 7,130,885 B2 * | 10/2006 | Chandra et al. | 709/206 |
| 7,243,163 B1 * | 7/2007 | Friend et al. | 709/248 |
| 7,287,097 B1 * | 10/2007 | Friend et al. | 709/248 |
| 7,801,960 B2 * | 9/2010 | Hockey | 709/206 |
| 7,836,054 B2 * | 11/2010 | Kawai et al. | 707/737 |
| 7,865,560 B2 * | 1/2011 | Rohall et al. | 709/206 |
| 7,941,431 B2 * | 5/2011 | Bluhm et al. | 707/736 |
| 8,108,397 B2 * | 1/2012 | Kawai et al. | 707/737 |
| 8,131,724 B2 * | 3/2012 | Frieder et al. | 707/737 |
| 2002/0040370 A1 * | 4/2002 | Entwistle | 707/205 |
| 2002/0049049 A1 * | 4/2002 | Sandahl et al. | 455/414 |
| 2002/0120748 A1 | 8/2002 | Schiavone et al. | |
| 2002/0156817 A1 * | 10/2002 | Lemus | 707/531 |
| 2003/0028587 A1 * | 2/2003 | Driscoll et al. | 709/203 |
| 2003/0065728 A1 * | 4/2003 | Milovanovic | 709/206 |
| 2003/0081252 A1 * | 5/2003 | Silverbrook et al. | 358/1.15 |
| 2003/0105827 A1 * | 6/2003 | Tan et al. | 709/206 |
| 2003/0110227 A1 * | 6/2003 | O'Hagan | 709/206 |
| 2003/0167310 A1 * | 9/2003 | Moody et al. | 709/206 |
| 2003/0177190 A1 * | 9/2003 | Moody et al. | 709/206 |
| 2003/0233418 A1 * | 12/2003 | Goldman | 709/206 |
| 2004/0073617 A1 * | 4/2004 | Milliken et al. | 709/206 |
| 2004/0117451 A1 * | 6/2004 | Chung | 709/207 |
| 2009/0192976 A1 * | 7/2009 | Spivack et al. | 706/55 |

OTHER PUBLICATIONS

Crawford, E; Kay, J; McCreath, E., "An Intelligent Interface for Sorting Electronic Mail" IUI'02, Jan. 13, 2002, pp. 182-183.
Segal, Richard; Kephart, Jeffrey, Mailcat: An Intelligent Assistant for Organizing E-mail, May 1, 1999, XP002301012.
Examination Report from European Patent Office, Nov. 11, 2006.
European Communication pursuant to Article 96(2) EPC. Application No. 03812113.3-2221. Date: Apr. 5. 2006.
Intellectual Property India, First Examination Report for Application No. 2306/delnp/2005, dated Mar. 16, 2006.
European Examination Report from the European Patent Office, Jun. 19, 2008.
Takkinen et al.: "Cafe: A Conceptual Model for Managing Information in Electronic Mail", Proceedings of the Annua Hawaii International Conference Onsystem Sciences, Jan. 1, 1998, pp. 44-53.
Office Action issued in connection with corresponding Chinese Application No. 03825530.8; Office Action issued on Jul. 5, 2010.
Office Action issued in connection with corresponding Canadian Application No. 2,507,374; Office Action issued on Jul. 26, 2010.

* cited by examiner

Figure 6

METHOD, SYSTEM AND COMPUTER SOFTWARE PRODUCT FOR PRE-SELECTING A FOLDER FOR A MESSAGE

FIELD OF THE INVENTION

The present invention relates generally to message storage, and more particularly relates to pre-selecting a folder from a plurality of folders for storing a message.

BACKGROUND OF THE INVENTION

Messaging systems such as electronic mail (e-mail) have revolutionized the way in which people communicate. One of the advantages of e-mail is that functions that will take the user considerable time using other messaging systems can be automated within an e-mail environment, making the system more convenient and user-friendly. However, there is an ongoing need to automate more functions, and to assist the user in executing frequently executed tasks involving multiple steps, such that a procedure that might previously have taken two or three steps, will now take only one step.

In messaging systems, specific messages are usually saved within a particular folder, such that all of the messages saved within that folder are alike in relevant respects. To select the correct folder, a user must typically sort through a number of folders, identify the correct folder, and then allocate the message to this folder. The number of steps required to perform this function can often be reduced to one by providing a folder pre-select function. The pre-select function would select a candidate for a folder to which to allocate the message. Subsequently, the user could either approve the selection, or follow the above-described feature of going through the folders to identify the correct folder. If the pre-selected folder is frequently correct, in that the user approves its selection, then the pre-select function makes the messaging system more user friendly and efficient.

In some contexts, it may be desirable to pre-select a folder for a current message based on how all of the existing messages have been stored. For example, it may be desirable to order all of the messages on the system according to an attribute of these messages—this attribute might be the sender or the subject or some other attribute. However, if this is done, then these indices must be maintained if there are any changes. This is expensive both in terms of processing and memory, and also may lead to errors. Further, in desktop systems where there are thousands of messages this could be highly impractical due to limitations imposed by processing speed, network bandwidth, memory and other factors.

In general, there will often be cases in which it is desirable to implement a folder pre-select function in a system in which resources are scarce. As a result, there remains a need to develop folder pre-selection functions that consume fewer resources.

SUMMARY OF THE INVENTION

An object of one aspect of the present invention is to provide an improved system for pre-selecting a folder for a current message.

In accordance with this first aspect of the present invention, there is provided a method for pre-selecting a folder for a current message, the folder being one of a plurality of folders for storing messages. The system comprises: (a) an electronic communication device; (b) a storage module on the electronic communication device for storing the plurality of folders; (c) a communication module on the electronic communication device for receiving and transmitting the current message; (d) a folder pre-selection cache on the electronic communication device having n configurable entries, n being a predetermined positive integer greater than one, each configurable entry being configurable to record an associated pre-selection criterion, derived from a message to distinguish the message, for matching with the current message and an associated folder identification for identifying an associated folder in the plurality of folders; (e) a message comparison module operating upon the folder pre-selection cache for comparing a comparison criterion, derived from the current message to distinguish the current message, with the associated pre-selection criterion of at least one entry in the folder pre-selection cache to determine a matching entry in the folder pre-selection cache; (f) a folder pre-selection module operating upon the folder pre-selection cache, for pre-selecting the folder identified by the associated folder identification of the matching entry when the message comparison module determines the matching entry in the folder pre-selection cache; (g) a user-interface means on the electronic communication device for displaying the current message and the pre-selected folder wherein the user-interface means comprises a folder selection module operable by a user, and the folder selection module is operable by the user to allocate the current message to a user selected folder in the plurality of folders; (h) a cache-updating means operating upon the folder pre-selection cache for updating the folder pre-selection cache based on up to n previous messages undergoing folder selection prior to the current message, n being a positive integer greater than 1, wherein each message in the up to n previous messages is allocated to a user-selected associated folder in the plurality of folders; the folder pre-selection cache includes a corresponding configurable entry for each message in the up to n messages; and, the cache-updating means is operable, for each message in the up to n messages, to update the folder pre-selection cache by configuring the corresponding configurable entry in the folder pre-selection cache such that the associated pre-selection criterion is derived from the message, and the associated folder identification of the corresponding entry identifies a user-selected associated folder previously selected for the message.

An object of a second aspect of the present invention is to provide an improved method for pre-selecting a folder for a current message.

In accordance with this second aspect of the present invention, there is provided a method for pre-selecting a folder for a current message. The folder is one of a plurality of folders for storing messages. A method of pre-selecting a folder for storing a current message, the folder being one of a plurality of folders, the method comprising: (a) providing a folder pre-selection cache on an electronic communication device having n configurable entries, n being a predetermined positive integer greater than one, each configurable entry being configured to include an associated pre-selection criterion, derived from a message to distinguish the message, for matching with the current message, and an associated folder identification for identifying an associated folder in the plurality of folders, wherein the folder pre-selection cache is configured based on the up to n previous messages undergoing folder selection prior to the current message, where n is a positive integer greater than 1; (b) for at least one entry in the folder pre-selection cache, comparing a comparison criterion, obtained from the current message to distinguish the current message, with the associated pre-selection criterion to determine a matching entry in the folder pre-selection cache; (c) pre-selecting the folder identified by the associated folder identification of the matching entry when the message comparison module determines the matching entry in the folder pre-selection cache; (d) providing a folder selection function to a user of the electronic communication device for selecting a user-selected folder from the plurality of folders for the current message; and (e) selecting the user-selected folder from the plurality of folders for storing the current message; wherein each message in the up to n messages is allocated to a user-selected associated folder in the plurality of folders; the folder pre-selection cache includes a corresponding configurable entry for each message in the up to n messages, and, the step of providing a folder pre-selection cache having n configurable entries further comprises, for each message in the up to n messages, updating the folder pre-selection cache by configuring the corresponding configurable entry in the folder pre-selection cache such that the associated pre-selection criterion is derived from the message, and the associated folder identification of the corresponding entry identifies the user-selected associated folder.

An object of a third aspect of the present invention is to provide an improved computer software product for configuring a computer to pre-select a folder for a current message.

In accordance with this third aspect of the present invention, there is provided a computer software product for configuring a computer to pre-select a folder for a current message. The folder is one of a plurality of folders for storing messages. The computer program product comprises a recording medium and means recorded on the recording medium for configuring the computer to perform the steps of: (a) providing a folder pre-selection cache having n configurable entries, n being a predetermined positive integer greater than one, each configurable entry being configured to include an associated pre-selection criterion, derived from a message to distinguish the message, for matching with the current message, and an associated folder identification for identifying an associated folder in the plurality of folders; (b) for at least one entry in the folder pre-selection cache, comparing a comparison criterion, obtained from the current message to distinguish the current message, with the associated pre-selection criterion to determine a matching entry in the folder pre-selection cache; (c) pre-selecting the folder identified by the associated folder identification of the matching entry when the message comparison module determines the matching entry in the folder pre-selection cache; (d) providing a folder selection function to a user for selecting a user-selected folder from the plurality of folders for the current message; and (e) selecting the user-selected folder from the plurality of folders for storing the current message; wherein each message in the up to n messages is allocated to a user-selected associated folder in the plurality of folders; the folder pre-selection cache includes a corresponding configurable entry for each message in the up to n messages, and, the step of providing a folder pre-selection cache having n configurable entries further comprises, for each message in the up to n messages, updating the folder pre-selection cache by configuring the corresponding configurable entry in the folder pre-selection cache such that the associated pre-selection criterion is derived from the message, and the associated folder identification of the corresponding entry identifies the user-selected associated folder.

In accordance with a fourth aspect of the present invention there is provided an improved system for pre-selecting a folder for a current message. The folder is one of a plurality of folders for storing messages. The system comprises: an electronic communication device; a storage module on the electronic communication device for storing the plurality of folders; a communication module on the electronic communication device for receiving or transmitting the current message; a folder pre-selection cache on the electronic communication device having n configurable entries, n being a predetermined positive integer greater than one, each configurable entry being configurable to record an associated pre-selection criterion, derived from a message to distinguish the message, for matching with the current message and an associated folder identification for identifying an associated folder in the plurality of folders; a message comparison module operating upon the folder pre-selection cache for comparing a comparison criterion, derived from the current message to distinguish the current message, with the associated pre-selection criterion of at least one entry in the folder pre-selection cache to determine a matching entry in the folder pre-selection cache; a folder pre-selection module operating upon the folder pre-selection cache for pre-selecting the folder identified by the associated folder identification of the matching entry when the message comparison module determines the matching entry in the folder pre-selection cache; and, a cache-updating means operating upon the folder pre-selection cache for updating the folder pre-selection cache based on up to n previous messages undergoing folder selection prior to the current message wherein each message in the up to n previous messages has an associated attachment file; the plurality of folders comprises a plurality of file folders for storing a plurality of potentially attachable files; the folder pre-selection module is operable by the user to select from the plurality of file folders a user-selected associated file folder for an associated attachment file for the current message; the folder pre-selection cache has a corresponding configurable entry for each message in the up to n messages; and, the cache-updating means is operable, for each message in the up to n messages, to update the folder pre-selection cache by configuring the corresponding configurable entry in the folder pre-selection cache such that the associated pre-selection criterion is derived from the message, and the associated folder identification of the corresponding entry identifies a user-selected associated folder previously selected for the associated attachment file.

In accordance with a fifth aspect of the present invention there is provided an improved method for pre-selecting a folder for a current message. The folder is one of a plurality of folders for storing a plurality of potentially attachable files. The method comprises: providing a folder pre-selection cache on an electronic communication device having n configurable entries, n being a predetermined positive integer greater than one, each configurable entry being configured to have an associated pre-selection criterion, derived from a message to distinguish the message, for matching with the current message, and an associated folder identification for identifying an associated folder in the plurality of folders; for at least one entry in the folder pre-selection cache, comparing a comparison criterion, obtained from the current message to distinguish the current message, with the associated pre-selection criterion to determine a matching entry in the folder pre-selection cache; pre-selecting the folder identified by the associated folder identification of the matching entry when the message comparison module determines the matching entry in the folder pre-selection cache; and, updating the folder pre-selection cache based on up to n previous messages undergoing folder selection prior to the current message wherein each message in the up to n previous messages has an associated attachment file; the folder pre-selection cache has a corresponding configurable entry for each message in the up to n messages; and, the step of providing a folder pre-selection cache having n configurable entries further comprises, for each message in the up to n messages, updating the folder pre-selection cache by configuring the corresponding configurable entry in the folder pre-selection cache such that the associated pre-selection criterion is derived from the message, and the associated folder identification of the corresponding entry identifies a user-selected associated folder previously selected for the associated attachment file.

In accordance with a sixth aspect of the present invention, there is provided a computer software product for configuring a computer to pre-select a folder for a current message. The folder is one of a plurality of folders for storing messages. The computer program product comprises: a recording medium; means recorded on the recording medium for configuring the computer to perform the steps of: (a) providing a folder pre-selection cache having n configurable entries, n being a predetermined positive integer greater than one, each configurable entry being configurable to record an associated pre-selection criterion, derived from a message to distinguish the message, for matching with the current message and an associated folder identification for identifying an associated folder in the plurality of folders; (b) for at least one entry in the folder pre-selection cache, comparing a comparison criterion, obtained from the current message to distinguish the current message, with the associated pre-selection criterion to determine a matching entry in the folder pre-selection cache; (c) pre-selecting the folder identified by the associated folder identification of the matching entry when the message comparison module determines the matching entry in the folder pre-selection cache; (d) providing a folder selection function to a user for selecting a user-selected folder from the plurality of folders for an associated attachment file for the current message; and (e) selecting the user-selected folder from the plurality of folders for storing an associated attachment file for the current message; wherein each message in the up to n previous messages has an associated attachment file; the plurality of folders comprises a plurality of file folders for storing a plurality of potentially attachable files; the folder pre-selection cache includes a corresponding configurable entry for each message in the up to n messages, and the step of providing a folder pre-selection cache having n configurable entries further comprises, for each message in the up to n messages, updating the folder pre-selection cache by configuring the corresponding configurable entry in the folder pre-selection cache such that the associated pre-selection criterion is derived from the message, and the associated folder identification of the corresponding entry identifies a user-selected associated folder previously selected for the associated attachment file.

BRIEF DESCRIPTION OF THE DRAWINGS

A detailed description of the preferred embodiments is provided herein below with reference to the following drawings, in which.

DETAILED DESCRIPTION OF THE PREFERRED EMBODIMENTS OF THE INVENTION

Figure 1:
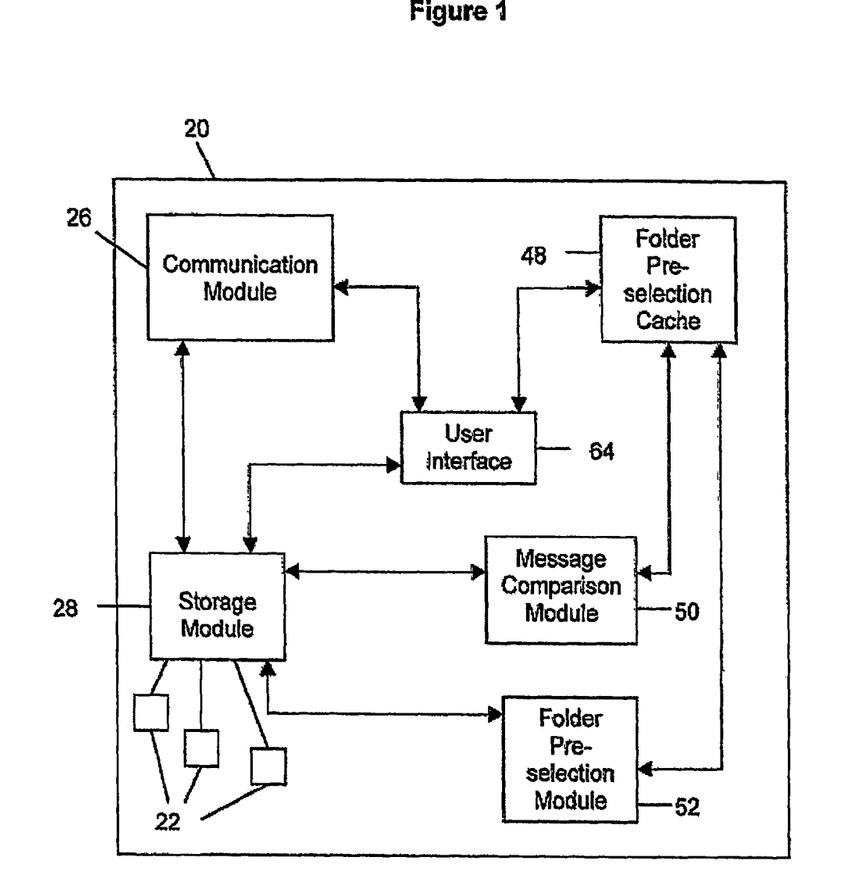
FIG. 1, in a block diagram, illustrates a system for pre-selecting a folder for a current message in accordance with the preferred embodiment of the present invention.

Referring to FIG. 1, there is illustrated in a block diagram a system 20 for pre-selecting a folder 22" for a current message 24 (FIG. 5) in accordance with a preferred embodiment of the invention. As shown in FIG. 1, the system 20 includes a communication module 26 for receiving or transmitting the current message 24, and a storage module 28 for storing a plurality of folders 22 for storing messages. The system pre-selects a folder 22' from this plurality of folders 22.

Figure 2:
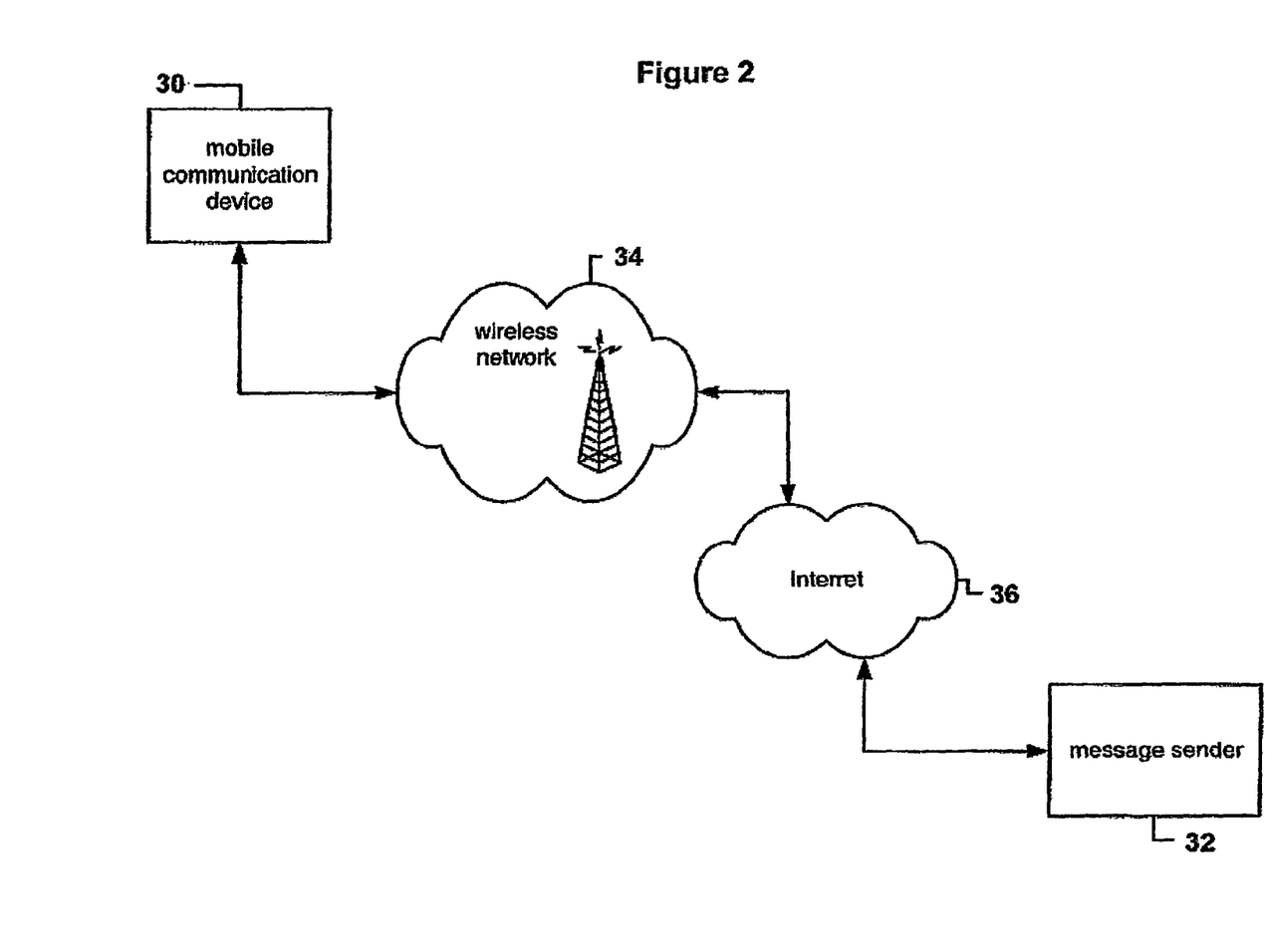
FIG. 2, in a block diagram, illustrates a mobile transmitter system for implementing the system of FIG. 1.

According to one embodiment, as illustrated in FIG. 2, the system 20 is a mobile communication device 30, which communicates with a message sender 32 via a wireless network 34 and the Internet 36. In this case, the communication module 26 would typically be a wireless transceiver.

Figure 5:
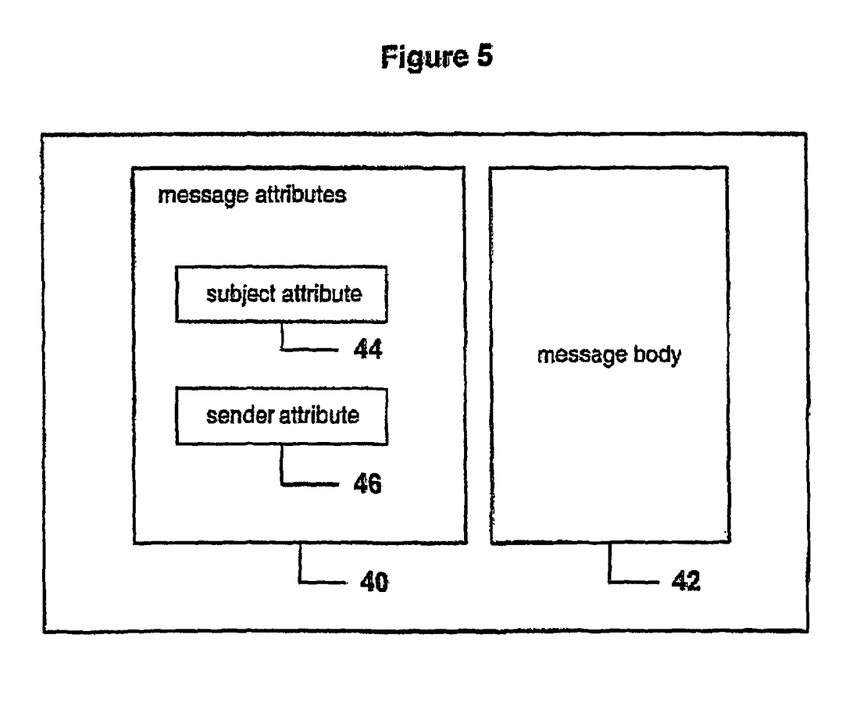
FIG. 5, in a block diagram, illustrates a message that is received or transmitted by the system of FIG. 1.

Pre-selection is made on the basis of features of the message 24. Referring to FIG. 5, there is illustrated in a block diagram a message 24 of the type that is stored in the plurality of folders 22 in the storage module 28 of the system 20 of FIG. 1. This message 24 includes message attributes 40 and a message body 42. The message body 42 includes the content of the message 24, while the message attributes 40 include specific attributes such as, as indicated in FIG. 5, a subject attribute 44 and a sender (or, in the case of an outgoing message, recipient) attribute 46. In addition, message attributes 40 may include other attributes such as the time sent, encoding, or contents.

The folder 22' that is pre-selected for storing the message 24 is determined by the folder pre-selection cache 48, message comparison module 50 and folder pre-selection module 52 of the system 20 of FIG. 1.

Figure 3:
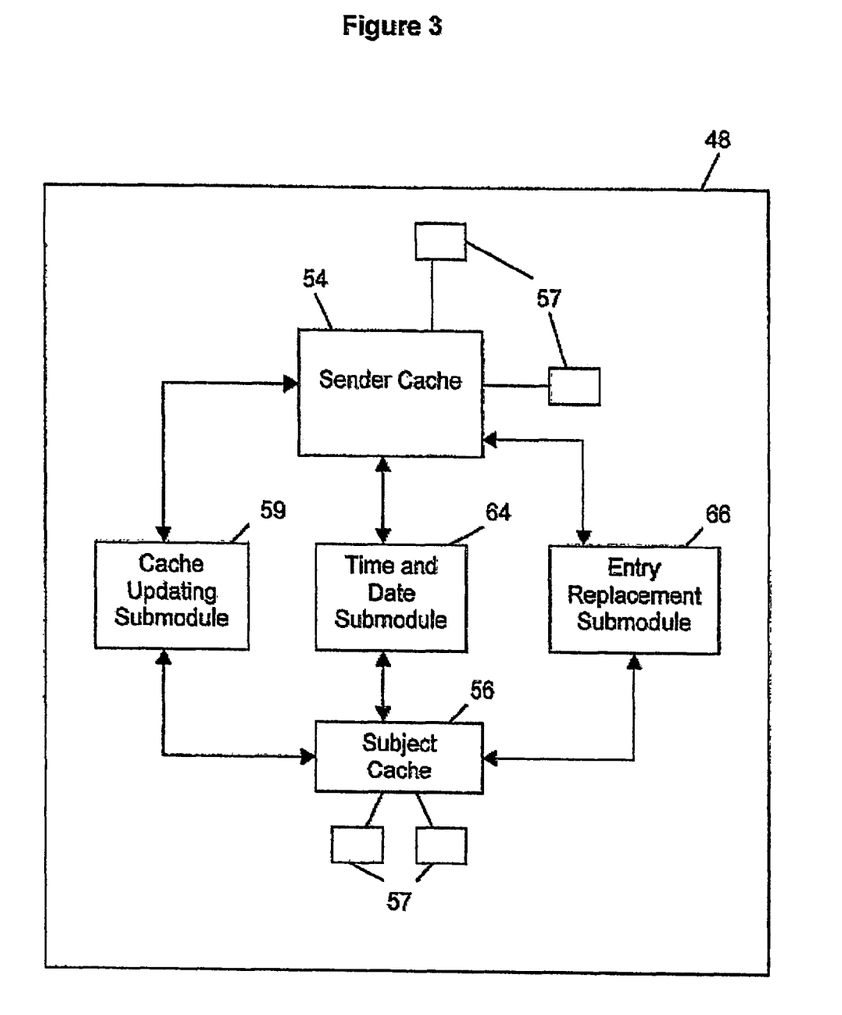
FIG. 3, in a block diagram, illustrates the folder pre-selection cache of FIG. 1; and, FIG. 4, in a block diagram, illustrates a configurable entry of the folder pre-selection cache of FIG. 3.

Referring to FIG. 3, there is illustrated in a block diagram the folder pre-selection cache 48 of FIG. 1. As shown in FIG. 3, the pre-selection cache 48 includes a sender cache 54 for storing sender entries 57 used to pre-select a folder 22' based on the sender attribute 46 of the current message 24, and a subject cache 56 including subject entries 57 used to pre-select the folder 22' for the current message 24 based on the subject attribute 44 of the current message 24. Optionally, the folder pre-selection cache 48 may include other caches, such as a time sent cache which would pre-select the folder 22' for the current message 24 based on the particular attribute selected—i.e. in this case the time sent attribute. Both the sender cache 54 and the subject cache 56 include more than one entry.

In an example operation, a current message 24 is received by the communication module 26 and is stored temporarily in the storage module 28. The message comparison module 50 then compares the current message 24 with entries 57 in either or both of the sender cache 54 or subject cache 56 to determine an entry having a message attribute 40 that matches a message attribute in the current message 24.

Figure 4:
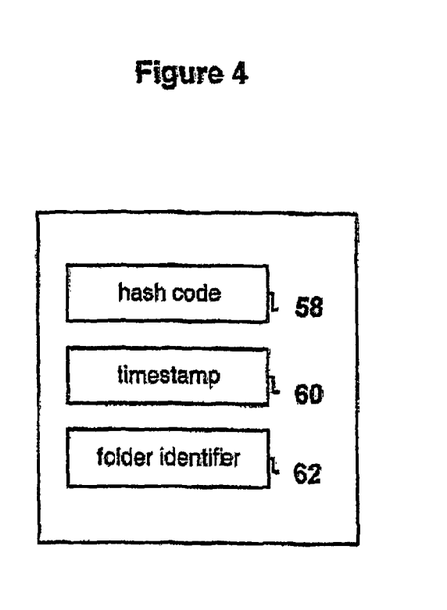

Preferably, the system of FIG. 1 also includes a derivation module for taking a hash code 58 of the selected attribute of the current message 24. Referring to FIG. 4, there is illustrated in a block diagram an entry 57 of either the sender cache 54 or the subject cache 56 of FIG. 3. As shown in FIG. 4, the entry 57 includes a hash code 58, time stamp 60 and folder identifier 62. The hash code 58 will be a hash obtained by applying a hash function to the subject attribute 44 in the case of the subject cache 56, and will be derived from the sender attribute 46 in the case of entries in the sender cache 54. If there is a match between the hash code 58 in an entry 57, and the hash code 58 generated from the current message 24 by the derivation module, then the folder identifier 62 of the entry 57 is used to determine the folder 22' to be pre-selected. Specifically, once the message comparison module 50 has determined a match with an entry 57 in the folder pre-selection cache 48, the folder pre-selection module 52 selects the folder 22' identified by the folder identifier 62 of the matching entry 57.

In some instances, the derivation module may take a hash code 58 of the selected attribute of the current message 24 that erroneously corresponds to a hash code of an entry 57 in either the subject cache 56 or the sender cache 54. That is, the hash function inadvertently maps different subjects or senders to the same hash code. This is called a collision. If this happens, then the folder identifier 62 of the erroneously selected entry 57 will, in all likelihood, designate an incorrect folder. In such instances, the user will simply override the folder pre-select function provided by the present invention and select the desired folder for storing the current message.

As shown in FIG. 1, the system 20 also includes a user interface 64. This user interface 64 includes a means for displaying the current message 24 as well as the pre-selected folder 22'. By using a folder allocation module, the user can then either approve this pre-selected folder 22', in which case the current message 24 will be allocated to the pre-selected folder 22', or, alternatively, can allocate the current message 24 to another folder in the plurality of folders 22.

According to a preferred embodiment, these decisions by the user are used to provide the entries 57 of the subject cache 56 and sender cache 54 of the folder pre-selection cache 48. For example, in the case of the subject cache 56 (or, for that matter, the sender cache 54), each of the entries corresponds to a message in up to n previous messages that have undergone folder selection prior to the current message 24. When the user allocated each of these n previous messages to a user-selected folder in the plurality of folders 22, a cache updating submodule 59 in the folder pre-selection cache 48 updated a corresponding configurable entry in the subject cache 56. As updated, this configurable entry is configured so that its hash code 58 or pre-selection criterion is derived from the message 24 and the folder identifier 62 of this entry 57 identifies the folder 22 selected by the user for storing this message 24. In the case of the subject cache 56, of course, the pre-selection criterion or hash code 58 is derived from a subject attribute 44 of the message 24, while in the case of the sender cache 54, the pre-selection criterion or hash code 58 would be generated from a sender attribute 46 of the message 24.

As shown in FIG. 3, the folder pre-selection cache 48 also includes a time and date submodule 64. As shown in FIG. 4, this time and date submodule 64 provides a time stamp 60 for each entry in the subject cache 56 and sender cache 54. Using the time stamp 60, the entries 57 are periodically replaced by an entry replacement submodule 66 (FIG. 3). Specifically, when a new message 24 is transmitted or received and then allocated by the user to a particular folder, this message 24 will become one of the n previous messages. Then, in order to include this message 24 in the n previous messages, room must be made by discarding the oldest entry. Thus, the entry replacement submodule 66, reviews the entries 57 to find the entry with the oldest time stamp 60, and discards this entry to make room for the new entry 57. Of course, if there is still room in the folder pre-selection cache 48, in that not all of the n configurable entries of each of the subject and sender cache 56, 54 have been configured to store information from one of n previously received messages 24, then new entries 57 for new messages 24 can be configured without discarding any older entries.

It will, of course, be appreciated by those skilled in the art that other methods may be implemented for updating the entries in each cache. Specifically, instead of discarding the oldest entry, the entry to be discarded could be selected randomly, or some other means used.

Preferably, the user will also be able to expand the total number n of entries 57 in each of the subject cache 56 and the sender cache 54 (these respective caches need not have the same number of entries) via the user interface 64. According to another preferred embodiment of the invention, the cache updating submodule 59 is operable to automatically change the positive integer n based on the storage space available in the storage module 28 for the folder pre-selection cache 48. In other words, as more storage space becomes available, n can be increased, and when storage space is reduced, n may be decreased. However changed, n must always remain a positive integer that is greater than one.

Sometimes, there will be no entry 57 having a hash code 58 corresponding to a hash code generated from either the sender attribute or subject attribute 46 of a message 24. In these cases, the message comparison module 50 will fail to determine a matching entry in the folder pre-selection cache 48. In such cases, the folder pre-selection module 52 selects a default folder 22, such as the inbox, for receiving the current message 24.

Optionally, the system 20 may pre-select a folder 22 for a plurality of messages 24. According to this aspect of the invention, the user would simply designate a plurality of messages 24 by, say, highlighting them, and then the folder pre-select function 22s would be triggered. Say the first message in the list of highlighted messages 24 cannot be matched with any of the entries in the folder pre-selection cache 48. Then the next message is checked. If this message 24 yields a hash code 58 that matches a hash code in an entry 57 of the folder pre-selection cache 48, then the folder identifier 62 of that entry 57 will be used to pre-select a folder 22s for storing all of the plurality of messages 24. If this message 24 does not yield a hash code 58 that matches a hash code 58 in an entry 57 of the folder pre-selection cache 48, then the folder pre-select function proceeds to the next message 24. This process is continued until a match is found, or all of the messages in the plurality of messages 24 fail to produce a match with an entry 57 in the folder pre-selection cache 48. In the latter event, the default folder will be selected for the plurality of messages 24.

Referring again to FIG. 2, the system 20 comprises the mobile communication device 30 according to one preferred embodiment of the invention. It is desirable that mobile communication devices be linked to associated desktops such that the storage structure on one mirrors the storage structure on the other, and changes in the storage structure on one will be reflected in the storage structure on the other. Accordingly, preferably, where messages or other documents are moved between folders on one of the desktop and the mobile communication device 30, the messages 24 and other documents will automatically be correspondingly moved on the other of the desktop or the mobile communication device 30. That is, when a user moves a message 24 on their desktop from one folder to another, the user's mobile communication device 30 will make a corresponding move of the corresponding message 24 on their mobile communication device 30 to a corresponding folder.

When this happens, it is necessary to update the corresponding entry 57 for the message 24 in the folder pre-selection cache 48. That is, the folder identifier 62 of this entry identified the folder originally selected by the user. However, where the user remotely moves the message 24 from this folder to another folder, the file identifier 62 must be updated to identify the new folder. According to a preferred embodiment of the invention, the cache updating sub-module 59 is operable to do this. Note that the cache updating sub-module 59 may be operable to update the entries of messages 24 being moved from folder to folder without any user interface 64 of the mobile communication device 30 being involved. That is, the messages 24 may be moved purely by remote.

This function of the cache-updating sub-module 59 will also be triggered when there are other automated changes in the storage structure. Say, for example, that the system automatically moves all of the messages from a particular sender to a particular folder. Then for each of these messages for which there are corresponding entries in the folder pre-selection cache 48, the cache-updating sub-module 59 is operable to update the file identifier to identify this particular folder. As in the foregoing example, the cache updating sub-module 59 may be operable to update the entries of messages 24 being moved from folder to folder without the user interface 64 of the mobile communication device 30 being involved.

Where the system 20 is implemented on a mobile communication device 30, this mobile communication device 30 will typically receive messages 24 from a server 20 that serves that mobile communication device 30. This server will periodically send messages 24 to the mobile communication device 30. As the server is, to some extent, dedicated to the mobile communication device 30, the server may have better information regarding how to pre-select a folder for the message 24 than the mobile communication device 30. According to a preferred embodiment of the invention, the message 24 from the server comprises a server-determined folder identifier for identifying a folder for storing the message. Preferably, the server-determined folder identifier includes an assigned weight. The assigned weight comprises a first weight and a second weight. If the server-determined folder identifier is of the first weight, then the recommendation is only a recommendation. That is, if the message comparison module 50 determines a matching entry for the current message 24, then the pre-selected folder 22 will be the folder identified by the associated folder identification of the matching entry 57. However, if the message comparison module 50 fails to determine a matching entry 57 for the message 24, then instead of pre-selecting the default folder, the folder identified by the server-determined folder identifier will be pre-selected. Alternatively, if the server-determined folder identifier is of the second weight, then the folder 22 identified by the server-determined folder identifier is selected whether or not there is a matching entry 57 for the message 24 in the folder pre-selection cache 48.

Figure 6:
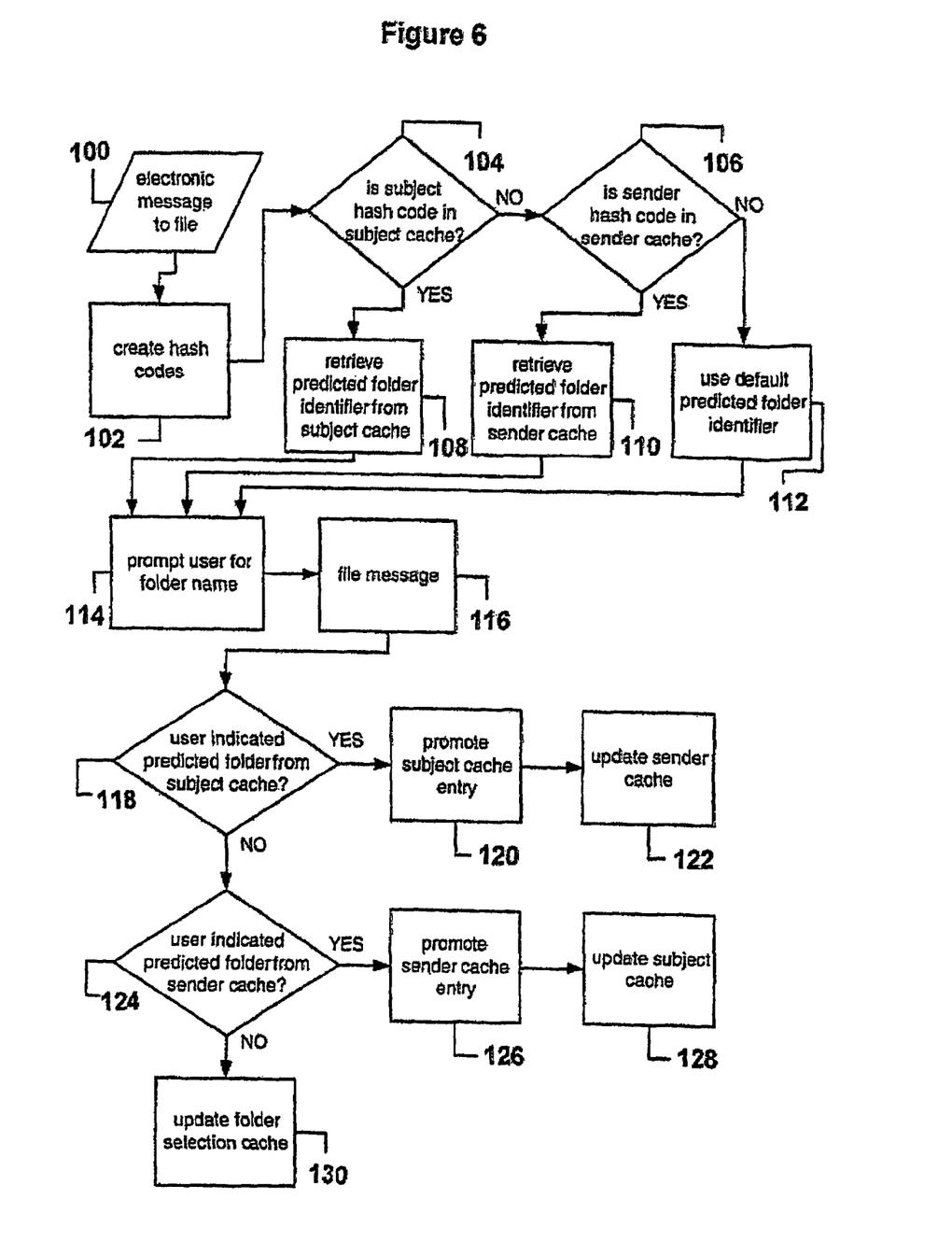
FIG. 6, in a flowchart, illustrates a method for pre-selecting a folder for a current message in accordance with a second preferred embodiment of the invention.

Referring to FIG. 6, there is illustrated a flowchart for implementing a method of pre-selecting a folder 22' for a current message 24 in accordance with an aspect of the present invention. In step 100, an electronic message 24 is either generated by the user, or received by the communication module 26. From this message 24, hash codes 58 are generated. These hash codes 58 may be generated from a message attribute 40 of the message 24, such as the sender attribute 46 or the subject attribute 44, or may be generated from the body of the message 24 itself. In step 102, hash codes 58 are generated for both the subject attribute 44 and the sender attribute 46 of the message 24.

In query 104, the system 20 checks whether the subject hash code 58 is in any of the entries of the subject cache 56. If query 104 returns the answer YES, then the method proceeds to step 108 in which the folder identification is retrieved from the cache entry having the subject hash code 58 created in step 102. The method then proceeds to step 114. If, on the other hand, query 104 returns the answer NO, the method proceeds to query 106, which queries whether the send hash code 58 generated in step 102 is in any of the entries of the sender cache 54. The sender hash code was derived from applying the hash function to the sender attribute 46. If query 106 returns the answer YES, then the method proceeds to step 110, in which it retrieves the folder identification from the entry 57 of the sender cache 54 including the sender hash code. The method then proceeds to step 114. If query 106 returns the answer NO, then the method proceeds to step 112 and the folder ID for the default folder is returned in step 112, before the method proceeds to step 114.

In step 114, the user is prompted for the folder name. At this point, the user may simply select the pre-selected folder 22', or alternatively may select a different folder 22. Then, in step 116, the message is filed under the folder selected by the user, and the method proceeds to query 118. Query 118 checks whether the user selected the predicted folder 22' from the subject cache 56. If query 118 returns the answer YES, then the method proceeds to step 120 in which the entry having the subject hash code generated in step 102 is promoted within the search order. That is, all of the entries 57 in the subject cache 56 are searched in a particular order—the search order. If an entry 57 is used to identify a folder 22, then, in order to improve the search speed for subsequent searches using the same subject hash code 58, the particular entry 57 used to provide the folder identification is moved up in the order of the entries searched so that it will be located more quickly the next time a search is conducted. Then, the method proceeds to step 122, in which the sender cache 54 is updated. Specifically, the sender cache 54 is updated to include an entry 57 having the sender hash determined in step 102 and the folder ID identifying the folder 22 determined by the user in step 114. At the same time, assuming information from n previous messages was already being stored in the sender cache 54, the oldest of the n entries in the sender cache 54 is discarded. There is no need to update the subject cache 56 by adding an entry 57 having the subject hash determined in step 102, as in step 120 a subject cache entry including the subject hash determined in step 104 has already been promoted in the search order. That is, the subject cache 56 already includes an entry 57 having the subject hash determined in step 104.

If query 118 returns the answer NO, then the method proceeds to query 124. Query 124 checks whether the user in step 114 indicated the predicted folder 22' from the sender cache 54. If query 124 returns the answer NO, then the method proceeds to step 130, in which the folder selection cache 48 is updated. Specifically, the folder selection cache 48 is updated such that the formerly current message 24 that has just been assigned to a folder 22 becomes one of the n previous messages 24. At the same time, assuming information from n previous messages was already being stored in the subject cache 56 and the sender cache 54, the oldest of the n previous messages 24 in each cache 54, 56 is discarded. Afterwards, there will be corresponding entry 57 in the sender cache 54 having the sender hash code determined in step 102, and a corresponding entry 57 in the subject cache 56 having the subject hash code determined in step 102. Both of these entries 57 will have a folder identification identifying the folder 22 indicated by the user in step 114. This is desirable, as the very fact that the method reached step 130 makes it apparent that the subject cache 56 did not previously have an entry 57 having the subject cache code determined in step 102, and that the sender cache 56 did not previously have an entry 57 having the sender cache code determined in step 102

If query 124 returns the answer YES, then the method proceeds to step 126 in which the entry 57 of the sender cache 54 is promoted or moved higher up in the search order such that it will be located more quickly by subsequent searches. Then, the method proceeds to step 128, in which the subject cache 56 is updated. That is, the subject cache 56 is updated to include an entry 57 having the subject hash code determined in step 102 and the folder ID identifying the folder determined by the user in step 114. This is desirable, as the very fact that the method reached step 128 makes it apparent that the subject cache 56 did not previously have an entry 57 having the subject cache code determined in step 102. At the same time, there is no need to add an entry 57 to the sender cache 54 having the sender hash code 54 determined in step 102, as the sender cache 54 already includes a sender cache entry including the sender hash code determined in step 102—this entry 57 was promoted in step 126.

According to a further preferred embodiment of the invention, a restoration or backup function is provided. According to this aspect of the invention, the entire folder pre-selection cache 48 may be backed up or saved Alternatively, to save storage resources, the folder pre-selection cache 48 may include a restoration function that regenerates the folder pre-selection cache 48 based on all of the messages 24 stored in files in the storage module 28. That is, on triggering of the restore function, the system 20 will go through each of the messages 24 still on the system 20 according to the time at which they were sent. That is, the restoration function will add entries 57 to the folder pre-selection cache 48 based on the messages 24 stored in the storage module 28. As the restoration function works through all of the messages 24 stored, some of these first added entries 57 will be discarded as they are replaced by other entries 57 generated from later messages 24. Other entries 57 will be promoted as they are used to correctly predict folders in which later messages 24 are actually stored. While this function consumes more processing power than simply backing up the folder pre-selection cache 48, it also consumes less in the way of storage resources. Further, the folder pre-selection cache 48 restored will, to a large extent, be optimized, as the entries 57 remaining in the folder pre-selection cache 48 after this procedure will to some extent be the entries 57 determined to have been useful in sorting through the messages 24 already on the system 20.

Optionally, the system 20 can be configured to pre-select a file folder for an attachment file for a current message. According to this aspect of the invention, among the folders 22 stored in the storage module 20 are file folders for storing files that are potentially attachable to messages. Similarly, the entries 57 of the folder pre-selection cache 48 are configured in a slightly different manner. That is, the message attributes 40, such as the subject attribute 44 or the sender/recipient attribute 46, may still be used to attempt to match the current message with an entry 57 in the folder pre-selection cache 148. As described above, this involves applying a hash function to the selected attribute to provide a hash code. The message comparison module 50 of the system 20 then compares this hash code with the hash code stored in the entries 57 of the folder pre-selection cache 48. However, the entries 57 have been configured such that their folder identifiers 62 identify file folders instead of message folders.

Say that the message comparison module 50 matches the hash code derived from the selected attribute of the current message with a hash code of an entry in the folder pre-selection cache 48. Then the folder pre-selection module 52 will pre-select the file folder identified by the file identifier of the matching entry. What this file folder is used for will depend on whether the current message is an incoming message or an outgoing message. If the current message is an incoming message, then the pre-selected folder 22 is for storing the attachment. That is, if the user indicates that he or she wishes to save the attachment, then the system will present the pre-selected file as an easily executable option. Alternatively, if the current message is an outgoing message, then the pre-selected folder 22 is presented as the folder in which the user can find the file to be attached to the current message. In both cases, of course, the user is free to override the pre-selection and to select another file folder.

In the aspects of the present invention described above, in which a file for storing a message is pre-selected, the entries of the folder pre-selection module were configured based on up to n previous message undergoing folder selection prior to the current message. Similarly, where the system is pre-selecting a file folder for a file attachment for a current message, the entries of the folder pre-selection module may be configured based on up to n previous message undergoing folder selection prior to the current message. However, in this case the folder selection referred to is the selection of a file folder for an attachment. Thus, all of the up to n previous messages, on the basis of which the entries of the folder pre-selection cache are configured, will have had an attached file for which a file folder was selected. However, this is not the only way in which the folder pre-selection cache 48 can be configured.

The entries 57 of the folder pre-selection cache 48 need not be configured based on up to n previous messages including attached files stored or extracted from folders selected by the user. Instead, the entries 57 of the folder pre-selection cache 48 may be configured based on up to n previously edited documents. That is, in the case of an outgoing e-mail, it is likely that the attachment for the e-mail will be a recently edited document. Thus, the entries 57 of the folder pre-selection cache 48 will identify those folders 22 in which work has most recently been done. In this case, the hash code 58 could be determined from the potentially attachable file itself. That is, it could be determined from the subject of the attachable file, or from an intended recipient of the attachable file. In the case of incoming e-mail, a selected subject or sender attribute may be compared against similar attributes selected from the n previously edited documents to determine a match and identify a folder.

Other variations and modifications of the invention are possible. For example, in addition to the subject cache and sender cache of the folder pre-selection cache described above, there could be other specific caches for storing different selected attributes of messages. Those skilled in the art will also appreciate that the present invention can be implemented in any number of e-mail systems, and not merely with mobile communication devices. All such modifications or variations are believed to be within the sphere and scope of the invention as defined by the claims appended hereto.

The invention claimed is:
1. A system for pre-selecting a candidate folder for a current message, the candidate folder being one of a plurality of folders for storing messages, the system comprising:
 an electronic communication device comprising a processor;
 a storage module on the electronic communication device for storing the plurality of folders;
 a communication module on the electronic communication device for receiving or transmitting the current message;

a derivation sub-module for operating the processor to derive at least one comparison criteria from at least one selected attribute of the current message;

a folder pre-selection cache on the electronic communication device having n configurable entries, n being a predetermined positive integer greater than one, each configurable entry being configurable based on how a previous message is stored to record an associated pre-selection criterion, derived by the processor from the previous message to distinguish the previous message, for matching with the current message, and an associated folder identification for identifying an associated folder in the plurality of folders;

a message comparison module operating upon the folder pre-selection cache for comparing the at least one comparison criterion, derived by the derivation sub-module from the at least one selected attribute of the current message to distinguish the current message from other messages, with the associated pre-selection criterion of at least one entry in the folder pre-selection cache to determine a matching entry in the folder pre-selection cache, wherein if the message comparison module fails to determine a matching entry for a first determined comparison criterion in the at least one comparison criterion, the first determined comparison criterion being derived from a first-considered attribute in the at least one attribute of the current message, then the derivation sub-module is further operable to derive a second determined comparison criterion in the at least one comparison criterion, the second determined comparison criterion being derived from a second-considered attribute in the at least one attribute of the current message, the second-considered attribute being different from the first-considered attribute;

a folder pre-selection module operating upon the folder pre-selection cache, for pre-selecting the candidate folder identified by the associated folder identification of the matching entry when the message comparison module determines the matching entry in the folder pre-selection cache;

a user-interface on the electronic communication device for displaying the current message and the pre-selected candidate folder before the message is filed, wherein the user-interface comprises a folder selection module operable by a user, and the folder selection module is operable by the user to allocate the current message to a user-selected folder in the plurality of folders;

a cache-updating sub-module operating upon the folder pre-selection cache for automatically updating the folder pre-selection cache based on up to n previous messages undergoing folder selection prior to the current message, n being a positive integer greater than 1, wherein each previous message in the up to n previous messages is allocated to a user-selected associated folder in the plurality of folders;

the folder pre-selection cache includes a corresponding configurable entry for each message in the up to n messages; and, the cache-updating sub-module is operable, for each message in the up to n messages, to automatically update the folder pre-selection cache based on how the message is filed by configuring the corresponding configurable entry in the folder pre-selection cache such that the associated pre-selection criterion is derived from the message by the processor, and the associated folder identification of the corresponding entry identifies a user-selected associated folder selected for the message.

2. The system as defined in claim 1 wherein when the message comparison module fails to determine the matching entry in the folder pre-selection cache, the folder pre-selection module is operable to select a default folder.

3. The system as defined in claim 1 further comprising a user-interface for selectably changing the positive integer n.

4. The system as defined in claim 1 wherein the cache-updating-sub-module automatically changes the positive integer n based on available storage space in the storage module for the folder pre-selection cache.

5. The system as defined in claim 1 further comprising a designation means for designating a plurality of the current messages, wherein the message comparison module is operable to compare the at least one comparison criterion, derived from at least one of the plurality of the current messages, with the associated pre-selection criterion of at least one entry in the folder pre-selection cache to determine the matching entry in the folder pre-selection cache; and, the folder pre-selection module is operable to pre-select the folder for the plurality of the current messages.

6. The system as defined in claim 1 wherein the pre-selection comparison criterion is the current message.

7. The system as defined in claim 1 wherein the electronic communication device is a mobile communication device.

8. The system as defined in claim 7 wherein the current message is from a server and comprises a server-determined folder identifier for identifying a server-determined folder for storing the current message.

9. The system as defined in claim 8 wherein the server-determined folder identifier has an assigned weight, the assigned weight being one of a first weight and a second weight: when the server-determined folder identifier is of the first weight, the server-determined folder is pre-selected if the message comparison module fails to determine the matching entry in the folder pre-selection cache, and the folder identified by the associated folder identification of the matching entry is pre-selected if the message comparison module determines the matching entry in the folder pre-selection cache; and, when the server-determined folder identifier is of the second weight, the server-determined folder is pre-selected.

10. The system as defined in claim 1 wherein, when a message in the up to n messages from a first folder in the plurality of folders to a second folder in the plurality of folders, the cache-updating sub-module is operable to update the associated folder identification for the corresponding entry from identifying the first folder to identify the second folder.

11. The system as defined in claim 1 wherein the folder pre-selection cache comprises an entry replacement sub-module for updating the folder pre-selection cache when a new message is allocated to an associated user-selected folder by discarding an existing entry and adding a new corresponding entry for the new message.

12. The system as defined In claim 11 wherein the folder pre-selection cache comprises a time-and-date sub-module for, for each message in the up to n messages, providing a time-and-date indicator to the corresponding entry for indicating when the message was allocated to an associated user-selected folder, and the entry replacement sub-module is operable to update the folder pre-selection cache when the new message is allocated to the associated user-selected folder by discarding the existing entry having an oldest time-and-date stamp.

13. The system as defined in claim 11 wherein
the derivation sub-module is further configured to, for each message in the up to n messages, derive the associated pre-selection criterion from an associated selected attribute of the message.

14. The system as defined in claim 13 wherein for each message in the up to n messages, the associated selected attribute of the message comprises one of an associated sender/recipient attribute of the message, an associated subject attribute of the message, a time sent of the message, a message body contents of the message, and a message encoding of the message, and for the current message, the at least one associated selected attribute of the message comprises at least one of the associated sender/recipient attribute of the message, the associated subject attribute of the message, the time sent of the message, the message body contents of the message, and the message encoding of the message.

15. The system as defined in claim 13 wherein the derivation sub-module comprises a hash determination means for, for each message in the up to n messages, deriving the associated pre-selection criterion from the message by applying a hash function to the associated selected attribute; and,
for the current message, deriving the at least one comparison criterion by applying the hash function to the at least one associated selected attribute.

16. The system as defined in claim 11 wherein each entry in the folder pre-selection cache is ordered according to a search order, the message comparison module is operable to compare the comparison criterion with the associated pre-selection criterion of each entry in the folder pre-selection cache according to the search order to determine a matching entry in the search order having an associated pre-selection criterion matching the comparison criterion; and,
the cache-updating sub-module is operable, when the matching entry is not a first entry in the search order and is the user-selected folder, to advance the matching entry within the search order.

17. The system as defined in claim 11 further comprising a restoration means for, when information is erased from the folder pre-selection cache, substantially restoring the folder pre-selection cache by processing each message in the plurality of folders in chronological order from an oldest message in the plurality of folders to a youngest message in the plurality of folders.

18. A system for pre-selecting a candidate folder for a current message, the candidate folder being one of a plurality of folders for storing messages, the system comprising:
an electronic communication device comprising a processor;
a storage module on the electronic communication device for storing the plurality of folders;
a communication module on the electronic communication device for receiving or transmitting the current message;
a derivation sub-module for operating the processor to derive at least one comparison criteria from at least one selected attribute of the current message;
a folder pre-selection cache on the electronic communication device having n configurable entries, n being a predetermined positive integer greater than one, each configurable entry being configurable based on how a previous message is stored to record an associated pre-selection criterion, derived by the processor from the previous message to distinguish the previous message, for matching with the current message and an associated folder identification for identifying an associated folder in the plurality of folders;
a message comparison module operating upon the folder pre-selection cache for comparing the at least one comparison criterion, derived by the processor from the at least one selected attribute of the current message to distinguish the current message, with the associated pre-selection criterion of at least one entry in the folder pre-selection cache to determine a matching entry in the folder pre-selection cache, wherein if the message comparison module fails to determine a matching entry for a first determined comparison criterion in the at least one comparison criterion, the first determined comparison criterion being derived from a first-considered attribute in the at least one attribute of the current message, then the derivation sub-module is further operable to derive a second determined comparison criterion in the at least one comparison criterion, the second determined comparison criterion being derived from a second-considered attribute in the at least one attribute of the current message, second-considered attribute being different from the first-considered attribute;
a folder pre-selection module operating upon the folder pre-selection cache for pre-selecting the candidate folder identified by the associated folder identification of the matching entry when the message comparison module determines the matching entry in the folder pre-selection cache; and,
a cache-updating sub-module operating upon the folder pre-selection cache for automatically updating the folder pre-selection cache based on up to n previous messages undergoing folder selection prior to the current message wherein
each message in the up to n previous messages has an associated attachment file;
the plurality of folders comprises a plurality of file folders for storing a plurality of potentially attachable files;
the folder pre-selection module is operable by the user to select from the plurality of file folders a user-selected associated file folder for an associated attachment file for the current message;
the folder pre-selection cache has a corresponding configurable entry for each message in the up to n messages; and,
the cache-updating sub-module is operable, for each message in the up to n messages, to automatically update the folder pre-selection cache based on how the message is filed by configuring the corresponding configurable entry in the folder pre-selection cache such that the associated pre-selection criterion is derived from the message by the processor, and the associated folder identification of the corresponding entry identifies a user-selected associated folder previously selected for the associated attachment file.

19. The system as defined in claim 18 wherein
the derivation sub-module is further configure to, for each message in the up to n messages, derive the associated pre-selection criterion from an associated selected attribute of the message.

20. The system as defined in claim 19 wherein for each message in the up to n messages, the associated selected attribute of the message comprises one of an associated sender/recipient attribute of the message, an associated subject attribute of the message, a time sent of the message, a message body contents of the message, and a message encoding of the message, and for the current message, the at least one associated selected attribute of the message comprises at least one of the associated sender/recipient attribute of the message, the associated subject attribute of the message, the time sent of the message, the message body contents of the message, and the message encoding of the message.

21. The system as defined in claim 20 wherein the derivation sub-module comprises a hash determination means for,
for each message in the up to n messages, deriving the associated pre-selection criterion from the message by applying a hash function to the associated selected attribute; and,
for the current message, deriving the at least one comparison criterion by applying the hash function to the at least one associated selected attribute.

22. The system as defined in claim 18 wherein the cache-updating sub-module updates the folder pre-selection cache based on up to n previously edited attachments stored in the plurality of file folders.

23. A method of pre-selecting a candidate folder for storing a current message, the candidate folder being one of a plurality of folders for storing messages, the method comprising:
(a) providing a folder pre-selection cache on an electronic communication device having n configurable entries, n being a predetermined positive integer greater than one, each configurable entry being configured based on how a message is filed to include an associated pre-selection criterion, derived by a processor of the electronic communication device from the previous message to distinguish the previous message, for matching with the current message, and an associated folder identification for identifying an associated folder in the plurality of folders, wherein the folder pre-selection cache is configured based on the up to n previous messages undergoing folder selection prior to the current message, where n is a positive integer greater than 1;
(b) for at least one entry in the folder pre-selection cache, comparing at least one comparison criterion, derived by the processor from at least one selected attribute of the current message to distinguish the current message, with the associated pre-selection criterion to determine a matching entry in the folder pre-selection cache, wherein if there is no matching entry for a first determined comparison criterion in the at least one comparison criterion, the first determined comparison criterion being derived from a first-considered attribute in the at least one attribute of the current message, then comparing the at least one comparison criterion, derived by the processor from at least one selected attribute of the current message comprises deriving a second determined comparison criterion in the at least one comparison criterion, the second determined comparison criterion being different from the first-considered attribute and derived from a second-considered attribute in the at least one attribute of the current message;
(c) pre-selecting the candidate folder identified by the associated folder identification of the matching entry when the message comparison module determines the matching entry in the folder pre-selection cache;
(d) prior to storing the current message, providing a folder selection function to a user of the electronic communication device for selecting a user-selected folder from the plurality of folders for the current message;
(e) selecting the user-selected folder from the plurality of folders for storing the current message; wherein
each message in the up to n messages is allocated to a user-selected associated folder in the plurality of folders;
the folder pre-selection cache includes a corresponding configurable entry for each message in the up to n messages, and,
the step of providing a folder pre-selection cache having n configurable entries further comprises, for each message in the up to n messages, automatically updating the folder pre-selection cache based on how a previous message is stored by configuring the corresponding configurable entry in the folder pre-selection cache such that the associated pre-selection criterion is derived from the message by the processor, and the associated folder identification of the corresponding entry identifies the user-selected associated folder.

24. The method as defined in claim 23 further comprising pre-selecting a default folder for receiving the current message when step (b) fails to determine the matching entry in the folder pre-selection cache.

25. The method as defined in claim 23 further comprising changing the positive integer n based on available storage space.

26. The method as defined in claim 23 further comprising designating a plurality of current messages and pre-selecting the folder for storing the plurality of current messages.

27. The method as defined in claim 23 further comprising reviewing the current message for a server-determined folder identifier having an assigned weight wherein the assigned weight is one of a first weight and a second weight;
when the server-determined folder identifier is of the first weight, pre-selecting the server-determined folder if the message comparison module fails to determine the matching entry in the folder pre-selection cache, and pre-selecting the folder identified by the associated folder identification of the matching entry when the message comparison module determines the matching entry in the folder pre-selection, cache; and,
when the server-determined folder identifier is of the second weight, pre-selecting the server-determined folder.

28. The method as defined in claim 23 wherein the pre-selection criterion is the current message.

29. The method as defined in claim 23 wherein, when a message in the up to n messages is moved from a first folder in the plurality of folders to a second folder in the plurality of folders, step (a) further comprises updating the associated folder identification for the corresponding entry from identifying the first folder to identify the second folder.

30. The method as defined in claim 23 wherein step (a) further comprises updating the folder pre-selection cache when a new message is allocated to a user-selected associated folder by discarding an existing entry and adding a new corresponding entry for the new message.

31. The method as defined in claim 30 wherein for each message in the up to n messages, step (a) further comprises providing in the corresponding configurable entry a time-and-date indicator for indicating when the message was message was allocated to a user-selected associated folder, and the folder pre-selection cache is updated when the new message is allocated to the user-selected folder by discarding the existing entry having an oldest time-and-date indicator and adding the new corresponding entry for the new message.

32. The method as defined in claim 30 wherein for each message in the up to n messages, the associated pre-selection criterion is derived from an associated selected attribute of the message; and,
the comparison criterion is derived from an associated selected attribute of the current message.

33. The method as defined in claim 32 wherein for each message in the up to n messages, the associated selected attribute of the message comprises one of an associated sender/recipient attribute of the message, an associated subject attribute of the message, a time sent of the message, a message body contents of the message, and a message encoding of the message, and for the current message, the at least one associated selected attribute of the message comprises at least one of the associated sender/recipient attribute of the message, the associated subject attribute of the message, the time sent of the message, the message body contents of the message, and the message encoding of the message.

34. The method as defined in claim 32 wherein for each message in the up to n messages, the associated pre-selection criterion is derived from an associated selected attribute of the message by applying a hash function to the associated selected attribute, and the comparison criterion is derived from an associated selected attribute of the current message by applying the hash function to the associated selected attribute.

35. The method as defined in claim 23 wherein each entry in the folder pre-selection cache is ordered according to a search order step (b) comprises comparing the comparison criterion with the associated pre-selection criterion of each entry in the folder pre-selection cache according to the search order;

and step (c) comprises determining a matching entry in the search order having an associated pre-selection criterion matching the comparison criterion, and pre-selecting the folder identified by the associated folder identification of the first entry;

wherein the method further comprises, when the matching entry is not a first entry in the search order and is the user-selected folder, advancing the matching entry within the search order.

36. The method as defined in claim 23 further comprising, when information is erased from the folder pre-selection cache, substantially restoring the folder pre-selection cache by, for each message in the plurality of folders in chronological order from an oldest message in the plurality of folders to a youngest message In the plurality of folders, performing steps (a), (b) and (c).

37. A method of pre-selecting a candidate folder for storing a current message, the candidate folder being one of a plurality of folders for storing a plurality of potentially attachable files, the method comprising:

providing a folder pre-selection cache on an electronic communication device having n configurable entries, n being a predetermined positive integer greater than one, each configurable entry being configured based on how a previous message is stored to include an associated pre-selection criterion, derived by a processor of the electronic communication device from the previous message to distinguish the previous message, for matching with the current message, and an associated folder identification for identifying an associated folder in the plurality of folders;

for at least one entry in the folder pre-selection cache, comparing at least one comparison criterion, derived by the processor from at least one selected attribute of the current message to distinguish the current message, with the associated pre-selection criterion to determine a matching entry in the folder pre-selection cache, wherein if there is no matching entry for a first determined comparison criterion in the at least one comparison criterion, the first determined comparison criterion being derived from a first-considered attribute in the at least one attribute of the current message, then comparing the at least one comparison criterion, derived by the processor from at least one selected attribute of the current message comprises deriving a second determined comparison criterion in the at least one comparison criterion, the second determined comparison criterion being different from the first-considered attribute and derived from a second-considered attribute in the at least one attribute of the current message;

pre-selecting the candidate folder identified by the associated folder identification of the matching entry when the message comparison module determines the matching entry in the folder pre-selection cache; and, automatically updating the folder pre-selection cache based on up to n previous messages undergoing folder selection prior to the current message wherein each message in the up to n previous messages has an associated attachment file;

the folder pre-selection cache has a corresponding configurable entry for each message in the up to n messages; and, the step of providing a folder pre-selection cache having n configurable entries further comprises, for each message in the up to n messages, automatically updating the folder pre-selection cache based on how the message is filed by configuring the corresponding configurable entry in the folder pre-selection cache such that the associated pre-selection criterion is derived from the message by the processor, and the associated folder identification of the corresponding entry identifies a user-selected associated folder previously selected for the associated attachment file.

38. The method as defined in claim 37 wherein the derivation sub-module is further configured to, for each message in the up to n messages, derive the associated pre-selection criterion from an associated selected attribute of the message.

39. The method as defined in claim 37 wherein for each message in the up to n messages, the associated selected attribute of the message comprises one of an associated sender/recipient attribute of the message, an associated subject attribute of the message, a time sent of the message, a message body contents of the message, and a message encoding of the message, and for the current message, the at least one associated selected attribute of the message comprises at least one of the associated sender/recipient attribute of the message, the associated subject attribute of the message, the time sent of the message, the message body contents of the message, and the message encoding of the message.

40. The method as defined in claim 39 wherein for each message in the up to n messages, the associated pre-selection criterion is derived from an associated selected attribute of the message by applying a hash function to the associated selected attribute, and the comparison criterion is derived from an associated selected attribute of the current message by applying the hash function to the associated selected attribute.

41. The method as defined in claim 37 further comprising updating the folder pre-selection cache based on up to n previously edited attachments stored in the plurality of file folders.

42. A computer program product for use on a computer system to pre-select a candidate folder for a current message, the candidate folder being one of a plurality of folders, the computer program product comprising:

a non-transitory computer-readable medium comprising computer readable instructions, executable by a processor, for configuring the computer to perform the steps of:

(a) providing a folder pre-selection cache having n configurable entries, n being a predetermined positive integer greater than one, each configurable entry being configured based on how a previous message is stored to include an associated pre-selection criterion, derived by a processor of the computer from the previous message to distinguish the previous message, for matching with the current message, and an associated folder identification for identifying an associated folder in the plurality of folders;

(b) for at least one entry in the folder pre-selection cache, comparing at least one comparison criterion, derived by the processor from at least one selected attribute of the current message to distinguish the current message, with the associated pre-selection criterion to determine a matching entry in the folder pre-selection cache, wherein if there is no matching entry for a first determined comparison criterion in the at least one comparison criterion, the first determined comparison criterion being derived from a first-considered attribute in the at least one attribute of the current message, then comparing the at least one comparison criterion, derived by the processor from at least one selected attribute of the current message comprises deriving a second determined comparison criterion in the at least one comparison criterion, the second determined comparison criterion being different from the first-considered attribute and derived from a second-considered attribute in the at least one attribute of the current message;

(c) pre-selecting the candidate folder identified by the associated folder identification of the matching entry when the message comparison module determines the matching entry in the folder pre-selection cache;

(d) prior to storing the current message, providing a folder selection function to a user for selecting a user-selected folder from the plurality of folders for the current message; and, (e) selecting the user-selected folder from the plurality of folders for storing the current message; wherein
each message in the up to n messages is allocated to a user-selected associated folder in the plurality of folders;
the folder pre-selection cache includes a corresponding configurable entry for each message in the up to n messages, and,
the step of providing a folder pre-selection cache having n configurable entries further comprises, for each message in the up to n messages, automatically updating the folder pre-selection cache based on how the message is filed by configuring the corresponding configurable entry in the folder pre-selection cache such that the associated pre-selection criterion is derived from the message, and the associated folder identification of the corresponding entry identifies the user-selected associated folder.

43. A computer program product for use on a computer system to pre-select a candidate folder for a current message, the candidate folder being one of a plurality of folders, the computer-readable medium comprising:
a non-transitory computer-readable medium comprising computer readable instructions, executable by a processor, for configuring the computer to perform the steps of:
(a) providing a folder pre-selection cache having n configurable entries, n being a predetermined positive integer greater than one, each configurable entry being configurable based on how a previous message is stored to record an associated pre-selection criterion, derived by a processor of the computer from the previous message to distinguish the previous message, for matching with the current message and an associated folder identification for identifying an associated folder in the plurality of folders;

(b) for at least one entry in the folder pre-selection cache, comparing at least one comparison criterion, derived by the processor from at least one selected attribute of the current message to distinguish the current message, with the associated pre-selection criterion to determine a matching entry in the folder pre-selection cache, wherein if there is no matching entry for a first determined comparison criterion in the at least one comparison criterion, the first determined comparison criterion being derived from a first-considered attribute in the at least one attribute of the current message, then comparing the at least one comparison criterion, derived by the processor from at least one selected attribute of the current message comprises deriving a second determined comparison criterion in the at least one comparison criterion, the second determined comparison criterion being different from the first-considered attribute and derived from a second-considered attribute in the at least one attribute of the current message;

(c) pre-selecting the candidate folder identified by the associated folder identification of the matching entry when the message comparison module determines the matching entry in the folder pre-selection cache;

(d) prior to storing the current message, providing a folder selection function to a user for selecting a user-selected folder from the plurality of folders for an associated attachment file for the current message;

(e) selecting the user-selected folder from the plurality of folders for storing an associated attachment file for the current message; wherein
each message in the up to n previous messages has an associated attachment file;
the plurality of folders comprises a plurality of file folders for storing a plurality of potentially attachable files;
the folder pre-selection cache includes a corresponding configurable entry for each message in the up to n messages, and,
the step of providing a folder pre-selection cache having n configurable entries further comprises, for each message in the up to n messages, automatically updating the folder pre-selection cache based on how the message is filed by configuring the corresponding configurable entry in the folder pre-selection cache such that the associated pre-selection criterion is derived from the message, and the associated folder identification of the corresponding entry identifies a user-selected associated folder previously selected for the associated attachment file.

44. The system as defined in claim 1 wherein the folder selection module provides a first user-selectable option to approve the pre-selected folder and a second user-selectable option to allocate the current message to any user selected user-selected folder in the plurality of folders.

45. The system as defined in claim 18 wherein the folder pre-selection module provides a first user-selectable option to approve the pre-selected folder and a second user-selectable option to allocate the current message to any user selected user-selected folder in the plurality of folders.

46. The method as defined in claim 23 wherein the folder selection function provides a first user-selectable option to approve the pre-selected folder and a second user-selectable option for selecting any user-selected folder from the plurality of folders for the current message.

47. The computer program product as defined in claim 42 wherein the folder selection function provides a first user-selectable option to approve the pre-selected folder and a second user-selectable option for selecting any user-selected folder from the plurality of folders for the current message.

48. The computer program product as defined in claim 43 wherein the folder selection function provides a first user-selectable option to approve the pre-selected folder and a second user-selectable option for selecting any user-selected folder from the plurality of folders for an associated attachment file for the current message.

* * * * *